United States Patent [19]

Ericsson

[11] Patent Number: 4,745,292
[45] Date of Patent: May 17, 1988

[54] ARRANGEMENT FOR ESTABLISHING THE THICKNESS OF PRINT APPLIED TO A PRINT CARRIER

[75] Inventor: Sylve J. D. Ericsson, Tumba, Sweden
[73] Assignee: Svecia Silkscreen Maskiner AB, Norsborg, Sweden
[21] Appl. No.: 27,658
[22] Filed: Mar. 19, 1987
[30] Foreign Application Priority Data

Mar. 19, 1986 [SE] Sweden .................................. 8601288

[51] Int. Cl.⁴ ............................................. G01N 21/86
[52] U.S. Cl. ..................................... 250/560; 356/381
[58] Field of Search ................. 250/560, 561; 356/376, 356/381

[56] References Cited

U.S. PATENT DOCUMENTS

| | | | |
|---|---|---|---|
| 3,834,819 | 9/1974 | Montone | 356/381 |
| 4,158,507 | 6/1979 | Himmel | 356/376 |
| 4,333,044 | 6/1982 | Blitchington | 250/561 |

*Primary Examiner*—David C. Nelms
*Assistant Examiner*—Stephone B. Allen
*Attorney, Agent, or Firm*—Burns, Doane, Swecker & Mathis

[57] ABSTRACT

The present invention refers to an arrangement for determining the thickness of a print applied to a print carrier.

The applied print whose thickness is to be determined is orientated in a manner which enables the print to be irradiated with light, e.g. light beams, emitted from a light source; in that the light is projected onto the print at an angle not greater than 90° in relation to a line orientated at right angles to the horizontal plane of the print; in that the respective magnitudes of a shadow image of the print thickness, produced by said light beams, and the extension of said shadow image along the carrier are evaluated together with information relating to the prevailing angle of the light beams; and in that the height or thickness of the print above the surface of the carrier is established on the basis of the thus evaluated magnitudes.

20 Claims, 2 Drawing Sheets

1

ARRANGEMENT FOR ESTABLISHING THE THICKNESS OF PRINT APPLIED TO A PRINT CARRIER

TECHNICAL FIELD

The present invention relates to an arrangement for establishing the thickness of print applied to a restricted locality on a print carrier.

Although the principles of the present invention can be applied within a multiplicity of technical fields, it has been found that these principles afford particular advantage when applied to a silkscreen printer of the kind having means with which a second pattern, or motif, deriving from a first pattern or motif, carried on a stencil can be orientated in relation to a carrier or material to receive print, hereinafter referred to as print carrier, while utilizing a first memory in which the desired position of the second pattern relative to a reference point is stored, and in which printer the print carrier onto which the second pattern is to be transferred can be displaced to a printing station, and in which means (an optical sensing or reading device) is provided for evaluating the true position of the material in said printing position. In addition hereto, means are provided for evaluating whether or not discrepancy will occur if the second pattern is printed on the material in the prevailing printing position thereof.

The possible discrepancy between the prevailing printing position and the desired printing position is evaluated, and if found to exist the frame carrying the stencil, and/or a printing table on which the print carrier rests, and/or the print carrier itself is displaced or brought in some other way to a position dependent on the magnitude of the positional discrepancy and the direction of said discrepancy, such that when the second pattern is applied to the print carrier it is printed in a position thereon in which a previously established discrepancy is fully compensated for, or satisfactorily compensated for. The position of the material is established with the aid of registration marks which have been devised for this purpose, or with the aid of a known part of an earlier printed pattern.

BACKGROUND PRIOR ART

A number of arrangement for establishing the thickness of print when the print is applied to, or transferred to a print carrier or print material are known to the art.

One method long applied in the art is based on the principle of placing the print whose thickness is to be determined on a measuring table and establishing the height of the print carrier above the table. The distance from the upper surface of the print is then established. The thickness of the print can then be established, by subtracting one set of height values from the other.

It will be obvious that such a method, adapted for the laboratory, will result in wide absolute and relative errors. In addition, it is difficult to carry out the method when determining print thicknesses in a production line.

It is also known in the art that the thickness of print applied to a print carrier in a silkscreen printer is dependent on a number of mutually different parameters, such as
(a) the pressure at which the squeegee abuts the stencil
(b) the angle at which the squeegee abuts the stencil
(c) the speed of relative movement between the squeegee and stencil (d) the mesh size of the stencil
(e) the printing ink used
(f) the viscosity of the printing ink used
(g) the carrier material used.

The silkscreen operator is aware that the print can be given a thickness which at least corresponds substantially to a pre-determined thickness, by varying one or more of the aforesaid parameters. Whether or not the thickness lies within acceptable limits is normally determined ocularly by the operator, who will normally rather accept a thicker layer than necessary, in order to guarantee full coverage, than a thin layer.

Experience has shown that the thickness of print can only be determined ocularly with certain types of inks and pigments, and then only when applied to certain print carriers.

SUMMARY OF THE PRESENT INVENTION

Technical Problems

It will therefore be seen that a qualified technical problem resides in providing ways and means which will enable the true thickness of an applied print to be established with the aid of simple means and, in addition, create conditions in which a subsequent print can be given a corresponding thickness in a silkscreen printer.

It will also be seen that a technical problem resides in the provision of means which will enable the thickness of a print applied in a silkscreen printer to be monitored or established for each print carrier, without requiring any appreciable additional time to establish said thickness.

A further technical problem in this regard, with view to the aforesaid problems, is one of creating condition which will enable the thickness of the print to be established as a median value applicable for a defined or delimited surface.

It will be understood that a qualified technical problem is one of creating in silkscreen printers conditions for simultaneously, or at least substantially simultaneously (without additional steps), firstly to evaluate the position of a print carrier on a printing table and to produce when necessary, control signals for displacing the print carrier and/or the stencil relative to the position of a pattern, or motif, produced by a stencil, and secondly to establish the true value of the thickness of a previous print and when required to transmit control signals to various means and devices in the silkscreen printer, so that a subsequent print, or motif, is given a thickness which is closer to a pre-determined value than the thickness of the previous print.

It will be seen that a further qualified technical problem is one of providing in fast operating silkscreen printers ways and means by which the thickness of a print can be established quickly, and control signals can be produced in response to the established thickness and transmitted to squeegee pressure control means and/or other control parameters determinative of the thickness of the second print, i.e. the applied print, so that a subsequent print will have a thickness which is closer to a pre-determined value than the evaluated print.

In the case of a silkscreen printer comprising a plurality of sequentially connected printing stations, it is particularly desirable to be able to control the thickness of the print in all, or practically all, printing stations. In view of this it may be convenient to establish the thickness of the print in one printing station and transmit signals corresponding to the established print thickness to a preceding printing station.

SOLUTION

The object of the present invention is to solve one or more of the aforementioned technical problems, and accordingly relates to an arrangement for establishing the absolute value of the thickness of a restricted print or motif applied to a print carrier, i.e. a material which is to receive print.

According to the present invention the applied print whose thickness is to be measured shall be orientated so that it can be irradiated with light, e.g. light beams, emitted from a lighting source. The lighting comprises light beams which are directed at an angle to a line extending at right angles to a plane through the print, such as to produce a shadow image along the print carrier commensurate with the thickness of the print, this shadow image being evaluated to establish the thickness of the print.

According to the invention, the thickness of the print on the print carrier is established by computing, inter alia, data relating to the extension of the shadow image along the print carrier and data relating to the prevailing angle of the light beams used.

More precisely, the height of the uppermost edge surface of the print, in the case of an unambiguously defined and delimited print surface, above the extension surface of an adjacent print carrier is established.

In accordance with the invention means are provided for evaluating the contour of the print or print surface, so as to enable the extension of the shadow contour along the print carrier to be established, thereby to establish the aforesaid differential which serves as a measurement of the extension of the shadow image on the carrier material.

According to one particularly preferred embodiment, the arrangement incorporates a plurality of light emitting diodes which are positioned around a sensing or reading device, in the form of a lens, to which electronic equipment is connected. The diodes are arranged to be activated singly or sequentially in groups, the shadow image of the print being read or detected during said diode activation, preferably during each separate diode activating procedure. The values obtained hereby may be used to produce a median value relating to the extension of the shadow image, this median value being used to establish an unambiguous measurement of the thickness of the print.

The arrangement according to the present invention can be used to advantage in a silkscreen printer which incorporates means for orientating a second pattern, or motif, transferred onto a print carrier from a first pattern, or motif, carried on a stencil, in relation to print material intended to receive the pattern, while using a first memory for storing the desired position of the second pattern in relation to a reference point, wherein the material to which the second pattern is transferred can be displaced to a printing position, wherein means are provided for evaluating the true position of the material in said position, and wherein means are provided for evaluating the discrepancy that would occur if the second pattern were to be transferred to the material in said position, and wherein any discrepancy between the true position and the desired position is evaluated and when such discrepancy exists the frame carrying the stencil and/or a printing table and/or the material is displaced or brought in some other way to a position dependent on the magnitude and direction of the discrepancy such that when applying the second pattern to the material said pattern obtains a position thereon in which the previously established discrepancy is fully compensated for, or satisfactorily compensated for. The position of the material can normally be established with the aid of registration marks provided on the print carrier or the material, or with the aid of part of a previously applied pattern.

In this regard, the stencil frame and/or print material can be displaced by means of at least two stepping motors or the like, and evaluated and calculated displacement values for each of said stepping motors are applied simultaneously and/or substantially simultaneously to the stepping motors, and that information concerning the thickness of a previous pattern, when necessary, generates signals for controlling print thickness dependent parameters capable of modifying the thickness to which a print is applied.

In accordance with another embodiment of the invention, the position of the material and/or its pattern is evaluated with the aid of one or more optical sensing or reading devices, preferably via an evaluation of the position of one or more registration marks or a part which serves as a registration mark, such that the sensing signals from the optical reading or sensing device can be transmitted to a first sensing signals for each line read in the optical unit, the significant content of which is transmitted to a real time storage unit. These sensing signals are evaluated by a processor which reconstructs the signals so as to enable the signals to be stored in a different form in a second memory so that said optical sensing or reading device can evaluate the extension of the shadow images along the carrier.

ADVANTAGES

Those advantages which primarily characterize the present invention reside in the creation of possibilities of being able to establish readily the thickness of a locally delimited print over a print carrier in a silkscreen printer, and to use data concerning the print thickness for controlling the thickness of a subsequent new print in a previous printing station, the current print and/or subsequent print, so that the thickness of one or more of these prints corresponds to a pre-determined thickness value.

The main characteristic features of an arrangement according to the invention are set forth in the characterizing clause of the following claim 1.

BRIEF DESCRIPTION OF THE DRAWINGS

An embodiment at present preferred and exhibiting significant characteristic features of the present invention will now be described in more detail with the reference to the accompanying drawings, in which.

BRIEF DESCRIPTION OF A PREFERRED EMBODIMENT

Figure 1:
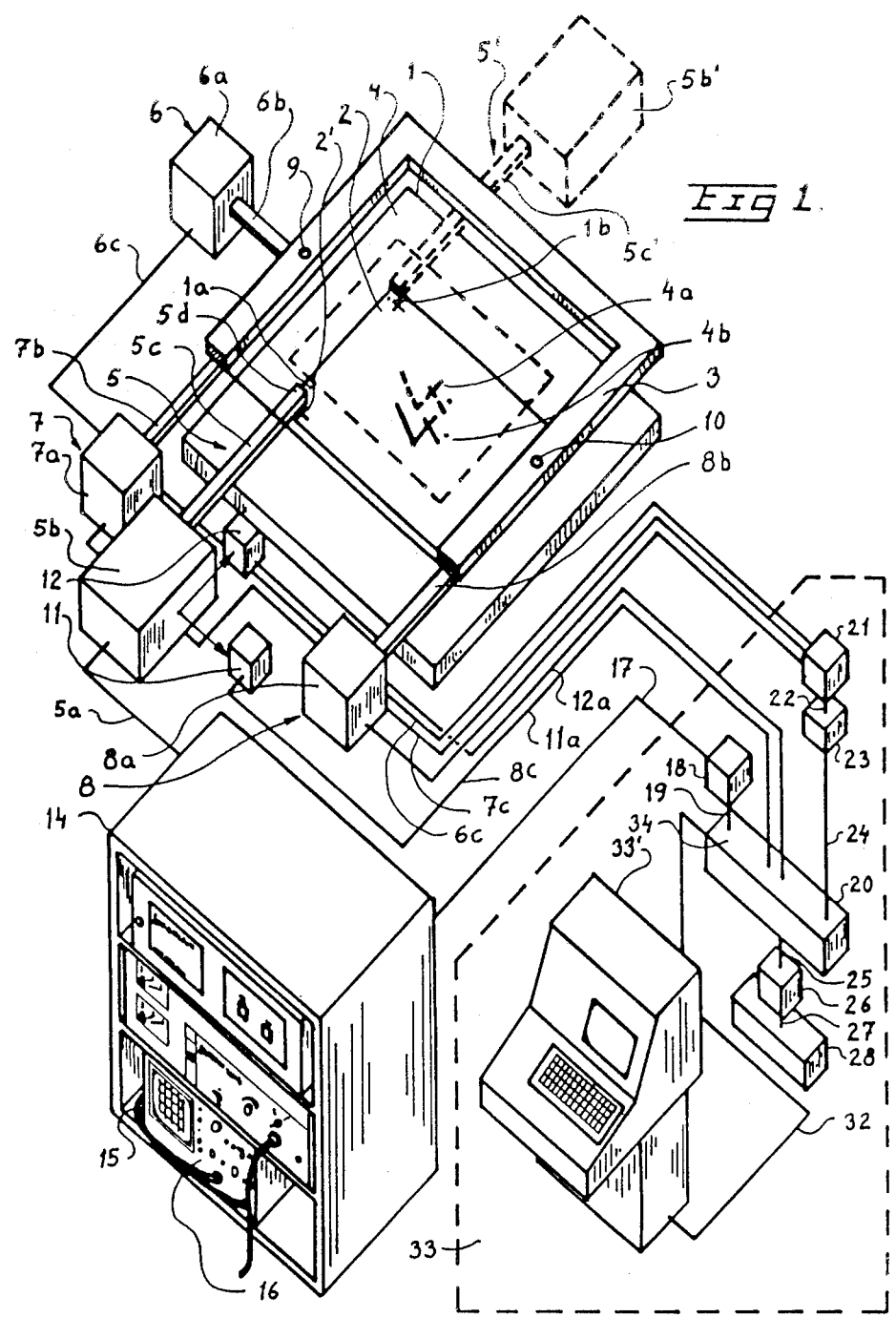
FIG. 1 is a greatly simplified perspective view of a silkscreen printer having first means for evaluating the position of a material in a contactless manner, second means for changing, when necessary, the position of the material in relation to a print dependent on the stencil pattern.

In FIG. 1 there is shown in perspective and in a highly simplified manner the printing table 1 of a silk-screen printer and print material 2, which has been to the table 1 and positioned in a registered printing position thereon with the aid of feed means not shown.

Located above the printing table 1 is a frame 3 in which there is stretched a stencil 4. The stencil 4 carries a first print, or motif, 4a, which in the illustrated embodiment has the form of the numeral 4, shown in broken lines. The print 4a is to be transferred to the print material 2 with the aid of a reciprocatingly movable squeegee (not shown). The applied print is hereinafter referred to as the second print 4b and is illustrated in full lines by the numeral "4".

Because of the elasticity of the stencil, the position of the first print 4a will deviate slightly from the intended print position of the second print, or motif 4b, and hence it is necessary to adjust the position of the first print, so that when transferred it will be located in the correct position on the print material 2.

It is also possible that the print material 2 has been placed slightly askew on the printing table by the feed means, despite the provision of material aligning and registering means 1a, 1b. Consequently, it may be necessary to adjust the position of the first print 4a in relation to its intended print position on the print material 2 also for this reason, so that an exactly located print is obtained on the print material 2.

For the purpose of establishing the position of the print material 2 on the printing table 1 there are provided two optical reading or sensing units 5, 5', each of which is located on a respective side of the printing table 1 and intended for reading or detecting a particular registration mark. Since the two optical readers are mutually identical, only one reader, 5, will be described hereinafter.

For the purpose of enabling adjustments to be made to the position of the stencil frame 3, and to enable the second print 4b to be printed on the material in precisely the correct position intended in relation to the position of the material on the printing table 1, the arrangement includes three frame displacing members 6, 7 and 8. The members 6 and 7 are intended to act on a common point 9 on the frame 3, whereas the member 8 is intended to act on a point 10 located on the frame diametrically opposite the point 9.

The displacing member 6 comprises a stepping motor 6a and an axially movable arm 6b, which is driven by the motor 6a. In practice, the arm 6b is longer than is indicated in the drawing.

Correspondingly, the displacing member 7 comprises a stepping motor 7a and an arm 7b, and the displacing member 8 comprises a stepping motor 8a and an arm 8b.

The expedient of displacing the frame 3 is only one of a number of possible expedients, and the displacing members 6, 7 and 8 could equally as well be arranged to act directly on the printing table and/or directly on the print material itself.

The prevailing settings of the reading units 5 in relation to the printing table 1, the stencil, or the frame and the time of reading the position of the print material on the table are evaluated through two position detecting devices 11 and 12. In the case of the illustrated embodiment, the setting of respective units 5 is determined in relation to the frame 3.

The reading unit 5 comprises a videocamera 5b, sold by RETICON, U.S.A., under serial designation MC 521, an arm 5c and an optical sensor or reader 5d. The camera is connected, by means of a conductor 5a, to a control unit 14, which is intended to receive the image of the registration mark evaluated by the sensor 5d. The control unit of the illustrated embodiment comprises a unit sold by RETICON under serial designation RS 521.

The control unit 14 is connected, by means of a conductor 15, to a monitor in the form of an oscilloscope 16, and is also connected, by a conductor 17, to a signal converter 18, sold by INTEL, U.S.A., under serial designation ICS 920.

The signal converter 18 is connected to a central unit 20, by means of a conductor 19.

The frame displacing members 6, 7, 8 are mutually identical, and comprise step feeders, or stepping motors, sold by MICRO-CONTROLE, Paris, France, under serial designation UP 70-40.

Each member 6, 7 and 8 is connected, via a respective conductor 6c, 7c and 8c to a power feeder 21, sold by MICRO-CONTROLE under serial designation IP-28, which in turn is connected, via a conductor 24, to an indexing unit 23, which is connected to the central unit 20 via a conductor 22.

The position detecting devices 11 and 12 each comprise an absolute code transmitter, sold by LEINE & LINDE, Stockholm, Sweden, under serial designation 7306, and are each connected to the control unit 20, via a respective conductor 11a, 12a.

The control unit 20 controls, via a conductor 25, a signal converter 26, which is similar to the signal converter 18 and which is connected to a programmable control circuit 28, via a conductor 27. The provision of such a control circuit is necessary for the operation of all silkscreen printers.

Since this control circuit is known per se, and since those skilled in this art are well aware of the control circuit locations to which respective signals shall be sent in order to achieve the function desired, no further description will be given in this respect here. The control circuits are normally adapted to the model or type of silkscreen printer concerned.

It will be understood that the blocks 18, 20, 21, 23 and 26 represent components which are incorporated physically in a complete control apparatus assembly, here referenced 33. For the sake of illustration, however, FIG. 1 illustrates a device 33' contained within the control apparatus 33, with the aforesaid blocks being shown externally of the device 33'.

Figure 2:
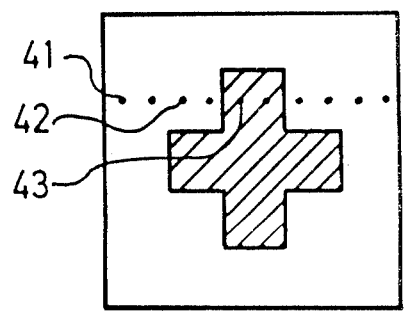
FIG. 2 illustrates in larger scale an optical window exhibiting a line of reading dots, the number of dots shown being far less than those used in reality, and further illustrates a registration mark centered in the window.

The central unit 20 is illustrated in more detail in FIG. 2 of Swedish Patent Application Ser. No. 8405066-5, and incorporates a computer or processor of the kind sold by INTEL, U.S.A., under serial designation BC 88/25, and also a videosignal control circuit connected to the computer and to a button-bank, via an electric conductor herefor, and a display means incorporated in the device 33'. The circuit comprises a video display control sold by INTEL under serial designation SBC 270.

The conductor is connected to an interface and to a memory of the kind sold by RETICON under the serial designation RSB 6020, which in turn is connected to the processor via a conductor (processor bus). The processor is able to communicate with a memory of the kind sold by ELECTRONIC SOLUTION, U.S.A., under the serial designation RAM/PROM-8C, via a conductor (processor bus).

Information concerning the x and y co-ordinates and the centers of mass of, for instance, the registration marks required in order to enable a print, or motif, to be applied to the print material in a pre-determined position and with pre-determined tolerances, is stored in a first memory.

The conductors 11a,12a are connected to an input modul of the kind sold by ELECTRONIC SOLUTION under serial designation SIM-64, which in turn is connected to the processor via a conductor herefor.

FIG. 1 illustrates an arrangement for enabling the first print 4a or motif, on the stencil to be transferred to the print material 2 and/or to a part of a print or motif previously applied to the material, in a precise given position thereon. The print material 2 is advanced onto the printing table 1 with the aid of conveying means (not shown) and is brought to a registered position on the table with the aid of material registering means 1a, 1b, with a permitted discrepancy of less than 1 mm. For example, the second print 4b applied to the material 2 may not deviate from a given value, or position, by more than 0.1 mm, and hence it is necessary to adjust the relative positions of the first print 4a on the stencil, and the print material 2 so that said print is transferred to a precise, desired location on the print material, within extremely narrow tolerances. This adjustment can be effected by first determining where the second print would be located on the print material if now adjustment was to be made, and then establishing the extent to which the stencil, and/or the print material, and/or the printing table must be moved in order for the first print 4a to be transferred to exactly the location desired on the print material 2.

In the illustrated embodiment, this adjustment to the position of the first print 4a carried by the stencil is effected with the aid of the aforementioned three stepping motors 6a, 7a and 8a, which act on the frame 3 carrying the stencil, so as to move the stencil in relation to the print material 2.

As beforementioned, the position of the print material 2 and/or its pattern is evaluated with the aid of two optical sensors or readers 5, 5', which are located mutually opposite one another for detecting a respective registration mark.

It can be mentioned here that the resolution of the lens system is dependent on the distance "a" (vide FIG. 4) between the lens 5d and the upwardly facing surface 2a of the print material 2, and the registration mark "+", referenced 2', can be discerned with varying degrees of sharpness in the camera system. The registration mark "+" may even be blurred at the edges.

Irrespective of whether the camera system and the camera discern the registration mark clearly, precisely as it is, or more diffusely as a contour line, the position of the contours of the mark shall nevertheless be determined.

The analogue signal obtained through the camera 5b, this signal being significant of the sensed image or figure, is transmitted to the aforementioned control unit 14 and converted there into digital form. The resultant digital signal is then transmitted through the conductor 17 to the signal converter 18, and from there through the conductor 19 to the central unit 20, in which the position of the registration mark or of the part of the pattern concerned is evaluated. The central unit 20 is constructed to compute a centre of mass reference significant of the position of the contours of the registration mark or said pattern portion, and to establish the x and y coordinates for the centre of mass reference thus established.

In order to make this computation, it is necessary to digitalize the analogue signals. Other requirements are that the registration mark has a smaller surface area than a pre-determined maximum surface, that the registration has a larger surface area than a pre-determined minimum surface, and that the surface has unambiguously defined, closed contours. The pre-requisites herefor are entered in the computer software.

The central unit 20 now evaluates the signals received and computes the positional values of the position of the print material 2, and generates from these values control signals which are sent to the stepping motor control unit 23 and to the power feeder 21, so as to activate the stepping motors 6a, 7a and 8a, such that the second print 4b will be located on the print material 2 in the position desired, with the slightest possible discrepancy.

The present invention now enables the thickness of the applied print, or motif, to be established with the aid of the aforedescribed devices and means.

In accordance with a further development of this facility, it is possible to control automatically the thickness of the print in relation to a pre-determined thickness value, on the basis of the aforesaid established thickness.

Should the thickness "c" (vide FIG. 4) deviate from a pre-determined value and a change in thickness is desired, it is proposed that a control signal is produced which will influence one or more of the following control parameters incorporated in the silkscreen printer:

(a) the squeegee pressure
(b) the abutment angle of the squeegee with the print material
(c) the speed at which the squeegee moves in relation to the print material.

One skilled in this art will be aware of those measures required to increase squeegee pressure and therewith decrease the thickness of the print applied. The steps required to change the abutment angle of the squeegee, for the purpose of modifying print thickness will also be readily apparent. It is also known that higher squeegee speeds result in thinner prints, and that the speed of the squeegee can be controlled with the aid of control signals applied to the squeegee drive motor.

It will also be readily understood that the thickness of the print can be modified in ways other than those mentioned.

For example, changes in print thickness can be achieved by modifying the viscosity of the printing paste, the mesh size of the stencil, and like measures.

It lies within the scope of the present invention to establish in one printing station the thickness of a previous print. Data concerning the thickness of this previous print and control signals for effecting changes in said thickness are transmitted from said one printing station to a preceding printing station and there caused to activate appropriate means for providing a print which has the desired thickness.

Alternatively, solely a signal relating to the thickness of the previous print is sent to the preceding printing station, in which case the necessary control signals are generated in said preceding printing station.

It also lies within the scope of the invention to evaluate in the printing station the thickness of a previous print and to provide the possibility of applying a print having a thickness which is dependent on the thickness of the previous print.

The thickness of the print may also be totally independent of the thickness of the previous print.

Finally, it also lies within the scope of the invention to control the thickness of the print in an immediately following printing station in dependence on the thickness of a previous print.

One important feature of the present invention resides in the evaluation of the positions of an upper edge part of a previous print or a registration mark, and in the subsequent evaluation of the positions of the border line of a shadow image of said upper edge part projected on the carrier.

Figure 3:
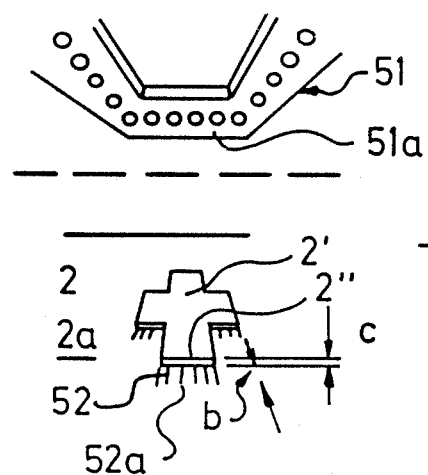
FIG. 3 illustrates the principles of the present invention.

In the illustrated embodiment one or more contours of a registration mark or carrier 2' are to be evaluated. In FIG. 3 the registration mark is shown to have the form of "+" which is greatly exaggerated in the perspective illustration of FIG. 3.

The positional values of the contours of the registration mark are established in the manner described and illustrated in the aforementioned Swedish Patent Application, with the aid of a light beam which is directed so as to produce no shadows.

The positional values significant for one or more of said contour parts of a registration mark can be stored in a memory intended herefor, or alternatively corresponding positional values deriving from two or more registration marks or significant print positions.

To enable the thickness of a print, or motif, to be established, and, in addition, to enable existing equipment in the silkscreen printer to be used for evaluating the positions of the registration marks, it is proposed in accordance with the invention to activate to this end one or more photodiodes 51 located around the registration mark 2', and then to take an optical reading.

This reading can be used to evaluate the extension of the shadow image contours of the registration mark along the carrier.

Since the same procedure is applied for each contour section, irrespective of the configuration of the mark and its position, the following description will be restricted solely to the contour section 2" illustrated in FIG. 3.

The photodiodes 51 are so placed around the optical reading or sensing unit that when all photodiodes are energized simultaneously no shadow images are formed of the print or the registration mark 2' on the upper surface 2a of the carrier.

An optical reading or sensing procedure shall be possible during simultaneous activating of the photodiodes, therewith to establish the positional values of the contours 2" of the registration mark. These values are stored in a known and previously described manner.

Thereafter only one or several of the photodiodes 51a are activated, such as to create a shadow image 52 of the upper contour 2" of the registration mark 2' along the material or carrier 2.

An optical reading can be taken during this activation period, therewith enabling the positional values of the contour line 52a of the shadow image 52 to be established, in a manner similar to that described above.

Figure 4:
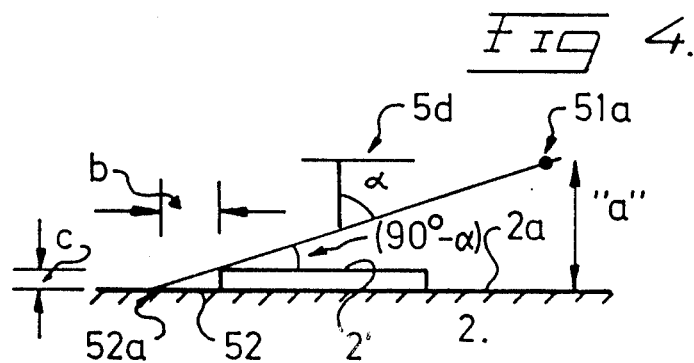
FIG. 4 illustrates certain computing methods for establishing the extension of the shadow image.

The length "b" of the shadow image can be determined, simply by subtracting the values obtained with regard to the contour line 2" from those values obtained with regard to the contour line 52a (vide FIG. 4).

Knowledge of the height "a" of the photodiodes 51a above the upper surface 2a of the carrier 2, and of the distance between said photodiode 51a and the upper contour 2" of the print, or alternatively the contour of the shadow image 52a, enables the illustrated angle α and the illustrated angular value "90°−α" to be established.

For the sake of simplicity it has been assumed here that the distance between the upper surface 2a of the carrier 2 and the photodiode 51a and the distance to the optical reading or sensing unit 5d is equal to and is assigned the distance "a".

With knowledge of the calculated angular values and the calculated length "b" of the shadow image, the height "c" of the print above the upper surface of the carrier 2 can be calculated by substituting these values in the formula $$c = b \times tg(90-\alpha)$$

The same calculation can now be made for other, or optionally for all contour lines and/or separate points which together form contour lines.

A median value can be produced for obtaining a more exact value of the thickness "c" of the print.

Thus, the control unit receives data relating to the thickness of the print.

When this value is not intended solely for display purposes, but is also intended to function as a control magnitude, the value obtained is converted in a known manner into an appropriate control signal form, for controlling printer parameters or devices with which the thickness of the print can be increased or decreased.

It will be understood that the invention is not restricted to the aforedescribed and illustrated exemplifying embodiments, and that modifications can be made within the scope of the invention as defined in the following claims.

I claim:

1. An arrangement for determining the thickness of a print applied to a print carrier, characterized in that the applied print whose thickness is to be determined is orientated in a manner which enables the print to be irradiated with light, e.g. light beams, emitted from a light source; in that the light is projected onto the print at an angle not greater than 90° in relation to a line orientated at right angles to the horizontal plane of the print; in that the respective magnitudes of a shadow image of the print thickness, produced by said light beams, and the extension of said shadow image along the carrier are evaluated together with information relating to the prevailing angle of the light beams; and in that the height or thickness of the print above the surface of the carrier is established on the basis of the thus evaluated magnitudes.

2. An arrangement according to claim 1, characterized in that the distance between said means or the optical sensing device and the carrier and/or the angle of the light beams are known magnitudes which provide data relating to the thickness of the print by calculating the extension of the shadow image.

3. An arrangement according to claim 1, characterized by first evaluating the positions of the registration marks or like contour, and subsequently evaluating the positions of said shadow contour, and subtracting the positional values one from the other, to establish the extension of the shadow image along the upper surface of the carrier.

4. An arrangement according to claims 1, characterized by converting the evaluated thickness to a control signal for transmission to one or more control means associated with the printer and responsible for the thickness of the print.

5. An arrangement according to claim 1, characterized in that means are provided for evaluating the contour or contour line of the print; that means are provided for evaluating the contour or contour line of the shadow image; and that the extension of the shadow image is established by subtracting the evaluated print contour or contour line from the evaluated contour or contour line of the shadow image.

6. An arrangement according to claim 1, characterized in that a plurality of light emitting diodes are arranged around a print and a shadow reading or sensing means.

7. An arrangement according to claim 5, characterized in that the distance between said means or the optical sensing device and the carrier and/or the angle of the light beams are known magnitudes which provide data relating to the thickness of the print by calculating the extension of the shadow image.

8. An arrangement according to claim 5, charaterized by first evaluating the positions of the registration marks or like contour, and subsequently evaluating the positions of said shadow contour, and subtracting the positional values one from the other, to establish the extension of the shadow image along the upper surface of the carrier.

9. An arrangement according to claim 5, characterized by converting the evaluated thickness to a control signal for transmission of one or more control means associated with the printer and responsible for the thickness of the print.

10. An arrangement according to claim 5, characterized in that a plurality of light emitting diodes are arranged around a print and shadow reading or sensing means.

11. An arrangement according to claim 10, characterized in that the diodes can be activated to emit light either singly or in groups; and in that the extension of the shadow image is evaluated during the activating of said diode(s).

12. An arrangement according to claim 6, characterized in that the distance between said means or the optical sensing device and the carrier and/or the angle of the light beams are known magnitudes which provide data relating to the thickness of the print by calculating the extension of the shadow image.

13. An arrangement according to claim 6, characterized by converting the evaluated thickness to a control signal for transmission of one or more control means associated with the printer and responsible for the thickness of the print.

14. An arrangement according to claim 6, characterized by first evaluating the positions of the registration marks or like contour, and subsequently evaluating the positions of said shadow contour, and subtracting the positional values one from the other, to establish the extension of the shadow image along the upper surface of the carrier.

15. An arrangement according to claim 6, characterized in that the diodes can be activated to emit light either singly or in groups; and in that the extension of the shadow image is evaluated during the activating of said diode(s).

16. An arrangement according to claim 15, characterized in that the distance between said means or the optical sensing device and the carrier and/or the angle of the light beams are known magnitudes which provide data relating to the thickness of the print by calculating the extension of the shadow image.

17. An arrangement according to claim 15, characterized by first evaluating the positions of the registration marks or like contour, and subsequently evaluating the positions of said shadow contour, and substracting the positional values one from the other, to establish the extension of the shadow image along the upper surface of the carrier.

18. An arrangment according to claim 15, characterized by converting the evaluated thickness to a control signal for transmission of one or more control means associated with the printer and responsible for the thickness of the print.

19. An arrangement according to claim 15, characterized in that a median shadow extension value is established from a plurality of mutually different shadow extension readings, and is used to establish the extension and thickness of the print.

20. An arrangement according to claim 19, characterized in that the distance between said means or the optical sensing device and the carrier and/or the angle of the light beams are known magnitudes which provide data relating to the thickness of the print by calculating the extension of the shadow image.

* * * * *